United States Patent Office
2,716,050
Patented Aug. 23, 1955

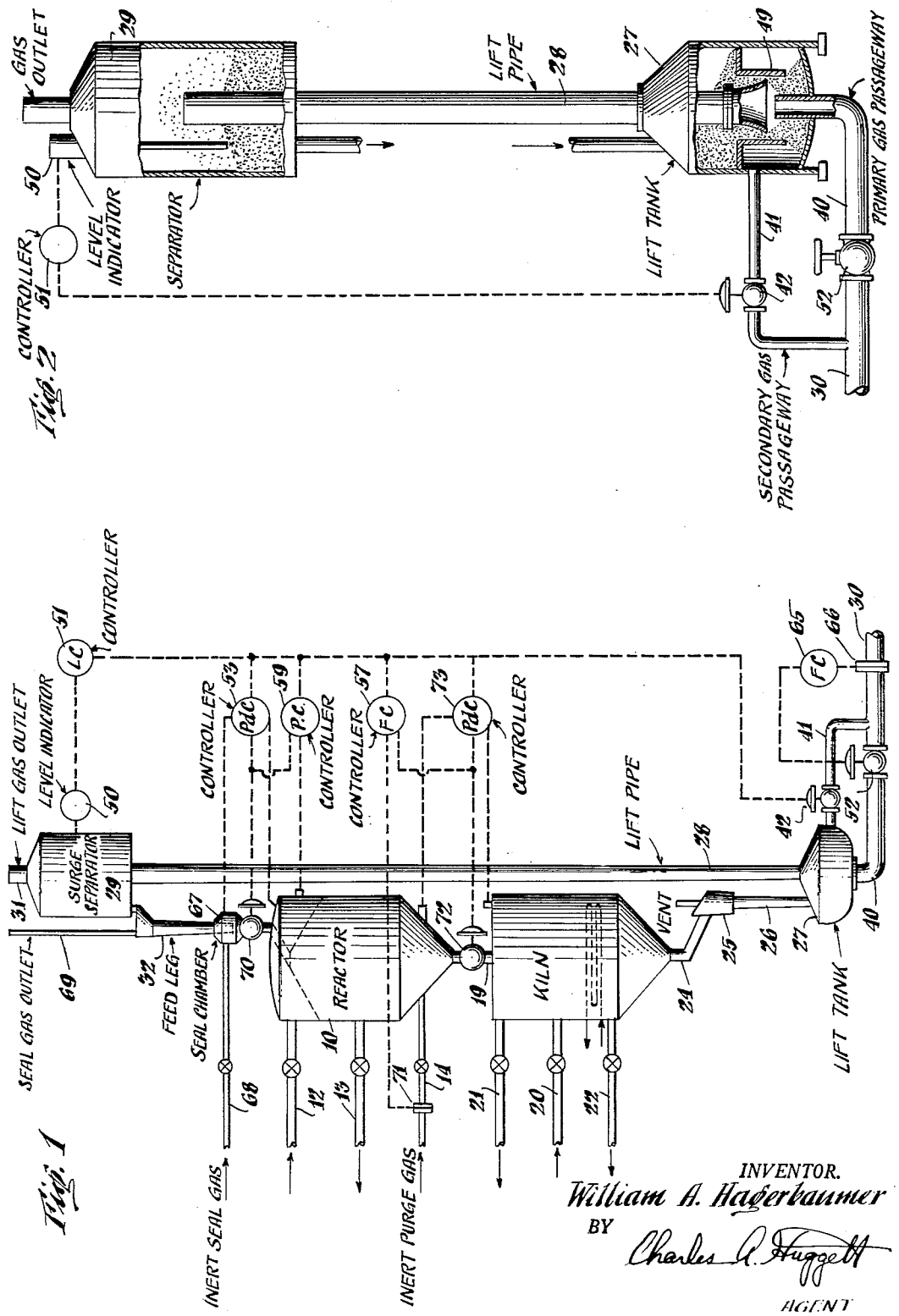

2,716,050

METHOD OF STOPPING THE PNEUMATIC TRANSFER OF GRANULAR MATERIAL IN A MOVING BED HYDROCARBON CONVERSION SYSTEM

William A. Hagerbaumer, Westfield, N. J., assignor to Socony Mobil Oil Company, Inc., a corporation of New York Application April 19, 1951, Serial No. 221,814

8 Claims. (Cl. 23—1)

This invention is directed to an improvement in the transfer of solid particle-form masses and is particularly directed to an improvement in a moving bed conversion system in which the granular contact material is lifted pneumatically.

In the petroleum art many processes are known in which hydrocarbons, at temperature and pressure suitable for conversion, are contacted with a granular solid material in the form of a gravitating column to produce converted products. While gravitating through the conversion zone, the particles receive a deposit of carbonaceous material or "coke" on their surface. The particles are removed from the bottom of the column to a reconditioning zone where they are contacted with a combustion supporting gas at temperatures high enough to burn off the coke deposits. The reconditioned contact material is returned, thereafter, to the top of the column in the conversion zone for reuse, completing a continuous cyclic path.

Examples of various processes in this industry which necessitate the use of granular contact material are polymerization, dehydrogenation, isomerization, alkylation, hydrogenation, reforming, cyclization, desulfurization and catalytic cracking. This invention will be described in relation to a catalytic cracking process, being understood, however, to apply broadly to any process or operation in which it is required to lift a particle-form solid material. For example, it may be applied to conversion processes wherein hydrocarbons, prepared for conversion, are brought into contact with inert refractory particles and converted products are removed therefrom. Typical of such processes is the production of ethylene from various gas oils at temperatures in the neighborhood of 1500° F.

The contact material may be natural or treated clays, such as bentonite, montmorillonite or kaolin or may take the nature of certain synthetic associations of silica, alumina, silica and alumina, or silica-alumina-chromia. The shape may be regular or irregular, for example, pellets, pills, granules or spherical beads. The term "granular" is used to cover all such material. The size may range from about 3–100 mesh, Tyler Screen Analysis, and preferably 4–12 mesh Tyler.

In the moving bed system of catalytic cracking, the particles in granular form are contacted with suitably prepared hydrocarbons while gravitating downwardly through a reaction zone in the form of a substantially compact column. The feed stock, usually a gas oil boiling somewhat above the gasoline boiling range, cracks in the presence of the hot catalyst, forming a substantial amount of hydrocarbons which do boil in the gasoline boiling range. The reaction zone is maintained at a temperature of about 800–1100° F. and usually at an advanced pressure of about 5–30 p. s. i. (gauge). Coked or spent catalyst is removed continuously from the bottom of the conversion or reaction zone and transferred to the top of a gravitating substantially compact column of particles in a regeneration zone. The catalyst, gravitating through the regeneration zone is contacted with a combustion supporting gas, such as air, to burn off the coke deposits from the surface. The regeneration zone is maintained at a temperature of about 1000–1300° F. and a pressure of about 1 p. s. i. (gauge). The coke-free or regenerated catalyst is withdrawn from the bottom of the column in the regeneration zone and transferred to the top of the column in the reaction zone completing the continuous path.

The contacting zones are sometimes located side-by-side, in which case two lifts are needed to raise catalyst from the bottom of each column to the top of the alternate column. In a more preferred arrangement, the contacting zones are superimposed one above the other, requiring only one lift. In a preferred form of lift, the contact material gravitated from the bottom of one of the contacting zones is contacted with a suitable lift gas and conveyed upward through a laterally confined passage to a location above the other zone. The gas and contact material are then separated and the contact material is gravitated onto the top of the column in said other zone. The gas pressure at the bottom of the passage is higher than the pressure at the top of the passage. These pressures may be different from those in the contacting zones.

The zones must be separated to prevent the interchange of gas from one zone to another. This is required, for one reason, to prevent fire. It is also required to provide independent operation of the contacting zones and the gas lift. Various valves and locks have been proposed but they were never commercially successful. They soon became inoperative, largely because of the abrasive action of the moving particles on the exposed metal surfaces. The particles also tended to pack in grooves and recesses, preventing proper operation of these devices. It was found that these devices could be eliminated by using the moving column of material as a sealing means. This is effected, at least in part, by using gravitating substantially compact vertical columns, having a cross-section substantially smaller than the cross-section of the contacting zones, and substantial height sufficient to effectively separate the zones. It is found that the contact material can be made to feed into the reaction zone even when maintained at a substantially advanced pressure from the receiving or storage zone thereabove, if the weight of the contact material in the seal column divided by the cross-sectional area of the column is greater than the pressure differential between the pressure in the reaction zone and the pressure in the receiving or storage zone. This is disclosed in more detail in co-pending application for Letters Patent, Serial Number 108,828, filed August 5, 1949 or in U. S. Patent No. 2,410,309, which issued October 29, 1946. Thus the contact material is gravitated as a substantially compact column downwardly from the receiving zone into the top of the conversion zone, from the bottom of the conversion zone to the top of a reconditioning zone and from the bottom of the reconditioning zone to a feeding zone near the bottom of an upwardly directed lift passage which connects the feeding zone with the receiving zone. No complicated locks or valves are used in the continuous column.

An inert gas is introduced into the column above and below at least the reaction zone and sometimes also the reconditioning zone in sufficient quantity to prevent the transfer of contacting fluids from their respective zones. It is customary practice in these systems to install safety devices which will signal the operator in the event emergency conditions arise, such as, for example, loss of seal in the reactor seal column, high reactor or regenerator pressure, and a failure to introduce sufficient inert gas into the column to provide adequate seal between the zones. These warning indicators have been connected to various slide or chopper valves, usually located at the bottom of the column to prevent the transfer of further catalyst. This is essential in these systems because, as indicated, the particles, in column form, provide the major portion of the seal between the zones. If the columns are blown out because of excessive pressure or drained because of a stoppage somewhere in the circulating system, irreparable damage may rapidly ensue.

These valves are subject to the disadvantages of all such valves in moving streams of contact material, in that they are eroded by the abrasive action of the catalyst, are jammed by the packing tendency of the particles, and are not susceptible of fool-proof design. In addition they are expensive.

It is an object of this invention to provide a method of stopping the circulation of contact material in a moving bed conversion system which overcomes the disadvantages of the prior art method.

This is made more apparent in the following detailed description of the invention and also in the attached drawing, all highly diagrammatic in form.

Figure 1 is a sketch of a preferred moving bed conversion system.

Figure 2 is a detailed sketch of the pneumatic transfer device used in Figure 1, shown partially in section.

Referring now to Figure 1, the reactor 10 is shown superimposed over the kiln or regenerator 11. Reactant hydrocarbons, in vapor, liquid or mixed form are introduced into the reactor 10 through the conduit 12 and converted products are removed from the vessel through the conduit 13. The particles gravitate downwardly through the vessel as a substantially compact mass, at an elevated temperature, about 800–1100° F., and elevated pressure, about 5–30 p. s. i. (gauge). The particles of contact material are purged in the bottom of the vessel by an inert gas, such as flue gas or steam introduced through the conduit 14, prior to their withdrawal from the bottom of the vessel.

The spent or coked catalyst particles are introduced into the top of the kiln through the connecting conduit 19. Combustion supporting gas, such as air, is introduced into the vessel 11 through the conduit 20 to travel both upward and downward through the bed while burning the coke deposits on the surface of the particles. The flue gas formed thereby is removed through the conduits 21, 22 to an exhaust stack, not shown. The kiln is generally operated at a low pressure, for example, about 1 p. s. i. (gauge), although much higher pressures can be used. The temperature in the kiln is maintained between about 1000–1300° F. Cooling coils are provided in the vessel for temperature adjustment. Temperatures much above 1300° F. heat damage the catalyst and are to be avoided. When inerts are used as the contact material, however, this limitation does not apply, and materially higher burning temperatures can be used.

The regenerated granular contact material is gravitated through the conduit 24 to a vent chamber 25 where gases passing through the column are removed. The granular particles are then gravitated downwardly through the conduit 26 into the top of the lift tank 27. The lift tank 27 is located at the bottom of the lift pipe 28 and the separator 29 is located at the top. The open-ended lift pipe is terminated intermediate the top and bottom of both vessels. The lower end of the pipe is located far enough below the top of the lift tank so that the granular material introduced into the tank through conduit 26 forms a substantially compact bed thereabout. Lift gas is introduced through the conduit 30 into the tank in sufficient amount to suspend and lift the particles up the pipe to the separator.

The gas and granular particles are separated in the separator. The gas is discharged through the conduit 31 and the particles settle onto the surface of a bed of contact material in the bottom of the vessel, somewhat below the top end of the lift pipe. The particles are withdrawn from the bottom of the separator 29 in substantially compact column form through the conduit 32. Inasmuch as there is generally a substantial difference in pressure between the vessels 29 and 10, the feed leg 32 must be sufficiently long to provide a gas seal. A suitable feed leg is shown and claimed in U. S. Patent No. 2,410,309 which issued October 29, 1946. The problem arises also in connection with feeding contact material into the lift tank 27 through the conduit 26. A similar feed leg can be utilized at that location.

Referring now to Figure 2, a species of the invention is illustrated in greater detail. Lift gas is introduced through the conduit 30 and splits into a primary stream in the passageway 40 and a secondary stream in the passageway 41. The baffle 49 in the lift tank 27, shown partly in section, is arranged around the lower end of the lift pipe to provide an annular portion of catalyst bed between the baffle and the lift pipe. The primary gas passageway 40 is terminated in the tank 27 just below or even projected into the lower end of the lift pipe 28, at a level above the surface of the catalyst formed beneath the lift pipe. This permits the gas to pass up the pipe without passing through any portion of the bed of contact material in the tank. The secondary gas passageway is terminated behind the baffle 49. The baffle is positioned to direct the secondary lift gas into the bed of contact material in the lift tank at locations substantially displaced from the lower end of the lift pipe, so as to pass through the intervening bed before passing up the pipe. The secondary gas pushes the catalyst in the intervening portion into the primary gas stream where it is suspended and lifted up the pipe. Suitable lift tanks are shown in more detail in a copending application for Letters Patent, Serial Number 211,258, filed February 16, 1951. The separator 29 at the top of the lift pipe is made substantially larger in cross-section than the pipe so that the gas velocity is substantially reduced. The particles drop onto a bed of the contact material maintained in the bottom of the vessel at a level somewhat below the top end of the pipe; say, for example, about ½–3 feet below the top.

When it is necessary to stop the flow of contact material up the pipe, the valve 42 is closed, stopping the introduction of secondary lift gas into the lift tank. This prevents the introduction of any more contact material into the lower end of the lift pipe. Meanwhile the primary lift gas introduction is continued. Normally the secondary gas stream is between about 5–15 per cent of the total gas flow. The remainder, 85–95 per cent of the total flow, is sufficient to lift all the particles then in the lift pipe, thereby clearing the pipe. This provides a quick, simple, effective and sure method of stopping the transfer of the granular material. But in addition to these advantages, the lift pipe is cleared of particles, and thereby made ready for instant reuse. If only one stream of lift gas were used and shut off to stop the granular material flow, the particles in the pipe would fall, leaving a plug or bed of granular material in the bottom of the pipe. This seals the pipe and makes it necessary to remove the granular particles from the pipe before reuse.

It is seen that by the above described method of pneumatic conveyance of particle-form material, incorporated in the moving bed conversion system of Figure 1, the catalyst circulation is stopped without the use of expensive slide valves, "chopper" valves or the like. There is a continuous column of catalyst from the separator down through the vessels to the lift tank. When the secondary gas valve is closed, the column movement is halted and thus the catalyst movement is halted by the use of a simple inexpensive gas valve.

When a stoppage occurs in the catalyst column, the catalyst level in the separator 29 rises. This is measured by a suitable level indicator 50. The storage space in the vessel is limited and the particles would soon flood back into the lift pipe. In order to prevent this undesirable condition, the level indicator is operably connected to a level controller 51, which is attached to the automatic valve 42. When the level of the bed in the separator rises above the predetermined high level, the secondary gas valve 42 is automatically closed while the valve 52 is left open. The catalyst circulation is stopped but the lift pipe is cleared of particles by the primary lift gas flowing through the conduit 40. The flow rate of the primary lift gas stream must be at least sufficient to clear the pipe of previously introduced contact material. A preferred arrangement, however, is shown on Figure 1. The valve 52 in the primary gas line is automatically controlled by the flow controller 65, which is operably connected to a flow rate indicator 66 in the main gas line 30. When the secondary gas valve 42 closes, because of rising catalyst level in the surge separator, the flow controller acts to open the valve 52 sufficient to maintain the gas flow to the gas lift substantially constant. This positively insures that the lift pipe will be cleared of catalyst and be ready for instant use when catalyst circulation is resumed.

Referring once again to Figure 1, a differential pressure controller 53 is located at the top of the reactor 10. The controller 53 measures the difference in pressure between the seal chamber 67 in the feed leg above the reactor and the top of the reactor. Inert gas is introduced into the seal chamber 67 through the conduit 68 generally under a pressure which is high enough to cause a small amount of gas to pass both upward and downward through the catalyst column from the seal chamber. The seal gas prevents air from being carried into the reaction chamber and reactant vapors from leaving the reaction zone through the feed leg. The seal gas is normally exhausted to atmosphere through a stack or outlet 69 located at the top of the feed leg. When the inert gas pressure in the seal chamber approaches a value which is too close to the pressure in the reactor for safe operation, the differential pressure controller closes the valve 70 in the feed valve to prevent the escape of oil vapor to atmosphere. This pressure differential may be, for example, about 0.1 to 1.0 p. s. i. (gauge). The valve may be a plug valve or slide valve which is normally completely open and inoperative, only being utilized during this and similar emergency conditions. Since loss of this differential pressure is usually an indication of a void in the seal leg, the differential pressure controller 53 is connected to the secondary valve 42 to simultaneously close that valve and prevent further catalyst transfer. Continued operation of the lift after closure of valve 70 would cause a catalyst void in the reactor to be formed and a flooding condition in the separator.

The catalyst feed leg to the reactor is designed to feed catalyst from the separator at approximately atmospheric pressure against a maximum reactor pressure, which may be about 5–30 p. s. i. (gauge). For example, the particular feed leg may be designed to feed against a pressure of not more than 15 p. s. i. (gauge). At higher pressure, the feed leg will break and the seal will be lost. As a safety measure, the pressure controller 59 is located at the top of the reactor. This controller is adjusted to close the valve 70 in the feed leg when the pressure exceeds say 13 p. s. i. (gauge). Because a void would then be formed in the column below this valve if circulation of catalyst continued, the controller 59 is connected to the secondary valve 42, thereby simultaneously closing this valve to prevent this undesirable result.

As previously indicated, purge gas is introduced into the bottom of the reactor 10 through the conduit 14 in sufficient quantity to remove substantially all the oil vapor from the catalyst, and to prevent a flow of oil vapor down into the top of the kiln. A flow controller 57 is located atop the kiln connected to and operable by a flow measuring instrument 71 located in the conduit 14. When the flow of purge gas in the conduit 14 falls below a safe value, about 40–60 per cent of the normal flow, or, for example, below 50 per cent of the normal purge gas flow, the controller 57 automatically closes the safety valve 72 in the interconnecting conduit 19 between the reactor and kiln. In order to prevent the formation of a void in the kiln, the controller 57 simultaneously actuates the secondary valve 42, stopping the catalyst circulation.

The differential pressure controller 73 between the reactor and the kiln is arranged to close the catalyst valve 72 whenever the pressure in the bottom of the reactor is not greater than the pressure in the top of the kiln by a safe minimum. The valve may close when the pressure differential is less than about 3 p. s. i., say, for example, 1 p. s. i. This condition can occur when the reactor is first placed in operation before any substantial amount of cracking has occurred to load up the gas compressors handling the gas leaving the synthetic crude fractionating column. Under this condition these compressors could actually pull a vacuum in the bottom of the reactor and, since the top of the kiln may be operating at 1 p. s. i. (gauge), air could flow from the top of the kiln into the reactor, with the possibility of a fire, even though the normal flow of purge steam is being supplied to the reactor. Stopping catalyst flow with the valve between the reactor and kiln would have the same effect as described before, therefore, the lift operation must be stopped simultaneously with the closing of this valve.

Some of the outstanding advantages of this invention are:

1. Only the catalyst actually in the lift pipe must be displaced into the catalyst surge hopper.

2. Lift air flow is continuous and at the same volume as normally used in the lift, since the valve controlling the primary lift air is operated from a flow controller measuring the total lift air. Therefore, closing the secondary air valve merely diverts the secondary air volume through the primary air line. This permits the lift air blower and the lift air heater to operate continuously without interruption or shutdown when catalyst flow must be stopped.

3. Continuous flow of lift air at full volume permits complete cleaning of all catalyst from the lift pipe, thus freeing it for reuse as soon as the catalyst valves can be opened.

4. Lifting of catalyst can be stopped rapidly by the operation of one inexpensive butterfly valve in the secondary air line, where otherwise up to four expensive catalyst valves would be required.

5. Catalyst flow can be resumed merely by opening the secondary air valve without the necessity of refilling the lift pot with catalyst to re-establish a pressure seal.

This invention is not limited to the specific embodiments shown above, being intended to cover all changes and modifications of the example of the invention herein chosen for purposes of the disclosure, which do not constitute departures from the spirit and scope of the invention.

I claim:

1. In a moving bed hydrocarbon conversion system in which the granular contact material is gravitated through conversion and reconditioning zones and is pneumatically conveyed upwardly through at least one laterally confined lift passage to complete a continuous cyclic path, the improved method of stopping the circulation of the contact material when emergency conditions arise which comprises: gravitating contact material from one of the contacting zones to form a compact bed about the lower end of the lift passage, introducing a primary lift gas into the passage to pass upwardly through the passage without passing through any of the compact bed, in at least sufficient amount to elevate particles of contact material in the passage but without causing particles to flow from the compact bed into the passage, introducing a secondary lift gas into the bed at at least one location displaced a substantial distance from the lower end of the passage, so as to pass through a substantial thickness of the bed whereby contact material is pushed into the primary lift gas, suspended and lifted up the passage to a receiving zone, gravitating the contact material from the receiving zone onto the top of the column in the other contacting zone, automatically stopping the secondary lift gas flow in response to a signal in the system which indicates emergency conditions requiring the stopping of the circulation of contact material, and continuing the flow of primary lift gas, at a flow rate high enough to clear the passage of contact material previously introduced into the passage, so as to prevent the accumulation of a plug of contact material in the lift passage.

2. In a moving bed hydrocarbon conversion system in which the granular contact material is gravitated through conversion and reconditioning zones and is pneumatically conveyed upwardly through at least one laterally confined lift passage to complete a continuous cyclic path, the improved method of stopping the circulation of the contact material when emergency conditions arise which comprises: gravitating contact material from one of the contacting zones to form a compact bed about the lower end of the lift passage, supplying a stream of lift gas to the bottom of the lift passage which is split into a primary and secondary gas stream before introduction into the bottom of the passage, introducing the primary lift gas stream into the passage to pass upwardly through the passage without passing through any of the compact bed, in at least sufficient amount to elevate particles of contact material in the passage but without causing particles to flow from the compact bed into the passage, introducing the secondary lift gas stream into the bed at at least one location displaced a substantial distance from the lower end of the passage, so as to pass through a substantial thickness of the bed whereby contact material is pushed into the primary lift gas, suspended and lifted up the passage to a receiving zone, gravitating the contact material from the receiving zone onto the top of the column in the other contacting zone, automatically stopping the secondary lift gas flow in response to a signal in the system which indicates emergency conditions requiring the stopping of the circulation of contact material, measuring continuously the stream of lift gas supplied to the lift passage, and automatically adjusting the flow of said primary lift gas stream in response to the flow measurement to keep the total gas flow through the passage constant after the stoppage of the secondary gas flow.

3. In a moving bed hydrocarbon conversion system in which the granular contact material is gravitated through conversion and reconditioning zones and is pneumatically conveyed upwardly through at least one laterally confined lift passage to a receiving zone to complete a continuous cyclic path, the improved method of stopping circulation of the contact material which comprises: gravitating contact material from one of the contacting zones to form a compact bed about the lower end of the lift passage, introducing a primary lift gas into the passage to pass upwardly through the passage without passing through any portion of the compact bed, in at least sufficient amount to elevate all particles of contact material through the passage and without causing particles to flow from the compact bed into the passage, introducing a secondary lift gas into the bed at at least one location displaced a substantial distance from the lower end of the passage, so as to pass through a substantial thickness of the bed whereby contact material is pushed into the primary lift gas, suspended and lifted up the passage to the receiving zone, separating lift gas and contact material in the receiving zone and collecting the descending particles of contact material on a bed of the material near the top of the passage, withdrawing contact material from this bed to the top of the column in the other contacting zone, continuously measuring the level of this bed, and automatically stopping the flow of secondary gas in response to this measurement when the bed level approaches the level of the lift passage outlet, so as to prevent the contact material from flooding back into the passage, while continuing the flow of primary gas to clear the passage of contact material previously introduced thereto.

4. In a moving bed conversion system in which the granular contact material is gravitated through conversion and reconditioning zones and is pneumatically conveyed upwardly through at least one laterally confined lift passage to complete a continuous cyclic path, the improved method of operation which comprises: gravitating contact material from one of the contacting zones to form a compact bed about the lower end of the lift passage, introducing a primary lift gas into the passage to pass upwardly through the passage without passing through any of the compact bed, in at least sufficient amount to elevate all particles of contact material through the passage and without causing particles to flow from the compact bed into the passage, introducing a secondary lift gas into the bed at at least one location displaced a substantial distance from the lower end of the passage, so as to pass through a substantial thickness of the bed whereby contact material is pushed into the primary lift gas, suspended and lifted up the passage to a receiving zone, gravitating the contact material from the receiving zone onto the top of the bed in the other contacting zone in the form of an elongated continuous downwardly directed column of restricted cross-section the length of the column being sufficient to supply the contact material smoothly from the receiving zone into the other contacting zone against an advanced pressure therein, measuring the pressure in said other zone, automatically stopping the secondary lift gas flow in response to said pressure measurement when the pressure approaches a predetermined maximum and continuing the flow of primary lift gas, at a flow rate high enough to clear the passage of contact material previously introduced into said passage, so as to prevent accumulation of a plug of contact material in the lift passage.

5. In a moving bed conversion system in which the granular contact material is gravitated through conversion and reconditioning zones and is pneumatically conveyed upwardly through at least one laterally confined lift passage to complete a continuous cyclic path, the improved method of operation which comprises: gravitating contact material from one of the contacting zones to form a compact bed about the lower end of the lift passage, introducing a primary lift gas into the passage to pass upwardly through the passage without passing through any of the compact bed, in at least sufficient amount to clear the passage of any particles located in the passage but without inducing particles to flow from the compact bed into the passage, introducing a secondary lift gas into the bed at at least one location displaced a substantial distance from the lower end of the passage, so as to pass through a substantial thickness of the bed whereby contact material is pushed into the primary lift gas, suspended and lifted up the passage to a receiving zone, gravitating the contact material downwardly from said receiving zone through an elongated laterally-confined passage and a gas sealing zone at the bottom of the passage into the top of the other contacting zone in the form of a substantially compact column, introducing a seal gas into said seal zone in sufficient amount to prevent the downward transfer of air and the upward transfer of reactant vapors, measuring the pressure differential between the sealing zone and the top of the contacting zone, automatically stopping the secondary lift gas flow in response to said pressure measurement when the pressure differential approaches a predetermined minimum and continuing the flow of primary lift gas, at a flow rate high enough to clear the passage of contact material previously introduced into said passage, so as to prevent the accumulation of a plug of contact material in the lift passage.

6. In a moving bed conversion system in which the granular contact material is gravitated through conversion and reconditioning zones and is pneumatically conveyed upwardly through at least one laterally confined lift passage to complete a continuous cyclic path, the improved method of operation which comprises: gravitating contact material from the reconditioning zone to form a compact bed about the lower end of the lift passage, introducing a primary lift gas into the passage to pass upwardly through the passage without passing through any of the compact bed, so that no particles are induced to flow from the compact bed into the passage but at least in sufficient amount to elevate particles in the passage, introducing a secondary lift gas into the bed at at least one location displaced a substantial distance from the lower end of the passage, so as to pass through a substantial thickness of the bed whereby contact material is pushed into the primary lift gas, suspended and lifted up the passage to a receiving zone, gravitating the contact material from the receiving zone onto the top of the bed in the conversion zone in the form of an elongated continuous downwardly directed column of restricted cross-section, the length of the column being sufficient to supply the contact material smoothly from the receiving zone into the conversion zone against an advanced pressure therein, introducing an inert seal gas into the bottom of said conversion zone in sufficient quantity to strip the conversion products from the contact material removed from the bottom of said zone, measuring the flow of seal gas to said conversion zone, automatically stopping the secondary lift gas in response to said flow measurement when the flow is reduced to a predetermined safe minimum and continuing the flow of primary lift gas, at a flow rate high enough to clear the passage of contact material previously introduced into said passage, so as to prevent accumulation of a plug of contact material in the lift passage.

7. In a moving bed conversion system in which the granular contact material is gravitated through conversion and reconditioning zones and is pneumatically conveyed upwardly through at least one laterally confined lift passage to complete a continuous cyclic path, the improved method of operation which comprises: gravitating contact material from the reconditioning zone to form a compact bed about the lower end of the lift passage, introducing a primary lift gas into the passage to pass upwardly through the passage without passing through any of the compact bed, the flow rate being adjusted to transfer through the passage all particles within the passage without causing particles to pass from the compact bed into the passage, introducing a secondary lift gas into the bed at at least one location displaced a substantial distance from the lower end of the passage, so as to pass through a substantial thickness of the bed whereby contact material is pushed into the primary lift gas, suspended and lifted up the passage to a receiving zone, gravitating the contact material from the receiving zone onto the top of the bed in the conversion zone in the form of an elongated continuous downwardly directed column of restricted cross-section, the length of the column being sufficient to supply the contact material smoothly from the receiving zone into the conversion zone against an advanced pressure therein, gravitating the contact material downwardly from the bottom of the conversion zone into the top of the reconditioning zone, maintaining the pressure in the reconditioning zone not substantially greater than atmospheric pressure, measuring the difference in pressure between the conversion and reconditioning zones, automatically stopping the flow of secondary lift gas in response to said pressure measurement when the pressure differential is reduced to a predetermined minimum and continuing the flow of primary lift gas at a flow rate high enough to clear the passage of contact material previously introduced into said passage.

8. In a moving bed hydrocarbon conversion system in which the granular contact material is gravitated through conversion and reconditioning zones and is pneumatically conveyed upwardly through at least one laterally confined lift passage to complete a continuous cyclic path, the improved method of stopping the circulation of the contact material when emergency conditions arise which comprises: gravitating contact material from one of the contacting zones to form a compact bed about the lower end of the lift passage, introducing a primary lift gas into the passage to pass upwardly through the passage without passing through any of the compact bed, the gas flow being adjusted so that particles are not induced to flow from the compact bed into the passage, introducing a secondary lift gas into the bed at at least one location displayed a substantial distance from the lower end of the passage so as to pass through a substantial thickness of the bed whereby contact material is pushed into the primary lift gas, suspended and lifted up the passage to a receiving zone, continuously measuring the total flow rate of the primary and secondary lift gas and adjusting the flow rate of the primary lift gas, so as to maintain the total gas flow substantially constant, gravitating the contact material from the receiving zone onto the top of the column in the other contacting zone, stopping only the secondary lift gas flow in response to a signal in the system which indicates emergency conditions requiring the stopping of the circulation of the contact material, whereby the circulation of the catalyst is immediately stopped and the passage is cleared of contact material.

References Cited in the file of this patent

UNITED STATES PATENTS

| | | |
|---|---|---|
| 1,339,977 | Pruden | May 11, 1920 |
| 1,390,974 | Von Porat | Sept. 13, 1921 |
| 2,433,726 | Angell | Dec. 30, 1947 |
| 2,458,162 | Hagerbaumer | Jan. 4, 1949 |
| 2,509,984 | Morrow | May 30, 1950 |
| 2,561,409 | Ardern | July 24, 1951 |
| 2,561,771 | Ardern | July 24, 1951 |

FOREIGN PATENTS

| | | |
|---|---|---|
| 7,075 | Holland | Mar. 18, 1922 |

OTHER REFERENCES

Kelley: "Measurement of Solids in T. C. C. Process," The Petroleum Engineer, September 1945, pages 136–142.